(12) United States Patent
Ting

(10) Patent No.: US 7,548,646 B2
(45) Date of Patent: Jun. 16, 2009

(54) METHOD FOR ADJUSTING SATURATION

(75) Inventor: Ming-Jeu Ting, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 1096 days.

(21) Appl. No.: 10/913,089

(22) Filed: Aug. 6, 2004

(65) Prior Publication Data
US 2005/0052545 A1    Mar. 10, 2005

(30) Foreign Application Priority Data
Sep. 5, 2003    (TW) .............................. 92124535 A

(51) Int. Cl.
*G06K 9/00* (2006.01)

(52) U.S. Cl. .................. 382/167; 382/262; 382/165; 382/274; 382/305; 348/223.1; 358/518; 358/520

(58) Field of Classification Search ................ 382/162, 382/167, 232, 164, 274; 358/518, 519, 520, 358/521, 522, 523; 348/453, 645, 223.1
See application file for complete search history.

(56) References Cited

U.S. PATENT DOCUMENTS 6,823,083 B1 * 11/2004 Watanabe et al. ............ 382/167

| | | | |
|---|---|---|---|
| 2003/0142879 A1 * | 7/2003 | Kim ............................. | 382/274 |
| 2004/0085458 A1 * | 5/2004 | Yanof et al. .................. | 348/223.1 |
| 2004/0085475 A1 * | 5/2004 | Skow et al. .................. | 348/362 |

FOREIGN PATENT DOCUMENTS

| JP | 2001251529 | 9/2001 |
|----|------------|--------|
| JP | 2003061109 | 2/2003 |
| JP | 2003230160 | 8/2003 |

* cited by examiner

*Primary Examiner*—Matthew C Bella
*Assistant Examiner*—Ali Bayat
(74) *Attorney, Agent, or Firm*—Thomas, Kayden, Horstemeyer & Risley

(57) ABSTRACT

A method for adjusting saturation by distinguishing a plurality of color systems and color system zones corresponding to the color systems from a $C_b$-$C_r$ coordinate, and finding the corresponding color system zone including the to-be-adjusted pixel of a digital color image. Thus, the first chroma $C_b$ and the second chroma $C_r$ of the to-be-adjusted pixel may be adjusted after the corresponding color system zone is found. This method can adjust a chroma of a specific color system without influencing the chroma of other color systems.

15 Claims, 2 Drawing Sheets

METHOD FOR ADJUSTING SATURATION

This application claims the benefit of Taiwan application Serial No. 092124535, filed Sep. 5, 2003, the subject matter of which is incorporated herein by reference.

BACKGROUND OF THE INVENTION

1. Field of the Invention

The invention relates in general to a saturation adjusting method, and more particularly to a method for adjusting saturation of a single color system.

2. Description of the Related Art

As for general users, the quality of a digital color image captured by a digital camera depends on the colorfulness of the digital color image. Hence, the quality of the digital color image for a general user substantially only depends on the colorfulness of the digital color image.

Accordingly, to adjust the colorfulness (i.e., saturation) of a digital color image becomes an important aim for the digital camera manufacturers. In the prior art method, the R, G, B values of each pixel in the digital color image is converted into the Y, $C_b$, $C_r$ values, which serve as the data for adjusting the brightness (Y) and chroma ($C_b$, $C_r$), respectively.

However, the prior art method for adjusting the pixel saturation usually directly adjusts $C_b$, $C_r$ chroma values of overall pixels after converting the R, G, B values of each pixel into the Y, $C_b$, $C_r$ values, respectively. When the $C_b$, $C_r$ values of each pixel in the digital color image are being directly adjusted, the saturation of each pixel is also adjusted simultaneously. Because the adjusted saturation of each pixel may influence one another, the color of the overall pixels of this digital color image is changed accordingly.

Therefore, the prior art method of adjusting the saturation of the pixels results in the color deviation of the final and overall pixels of the digital color image. In addition, even if the color deviation is not too large, the saturation of the final and overall pixels still has been adjusted and thus the color contrasts between the overall pixels cannot be enhanced. Hence, the adjusted color saturation effect is poor.

SUMMARY OF THE INVENTION

It is therefore an object of the invention to provide a saturation adjusting method capable of adjusting the saturation of each single color system independently.

It is therefore another object of the invention to provide a method for adjusting the saturation of a digital color image by adjusting a first chroma $C_b$ and a second chroma $C_r$ within a color system zone divided from a $C_b$-$C_r$ coordinate.

In a preferred embodiment of the invention, a coordinate with four quadrants is utilized, wherein the quadrants are defined by a first chroma and a second chroma coordinate axes and each quadrant represents a color system zone. Thus, it is possible to determine the quadrant that a pixel is within according to the signs of the first and the second chroma values of the pixel. Consequently, the saturation of the pixels within the to-be-adjusted color system zone may be adjusted by changing the first and the second chroma values of the pixels.

In another preferred embodiment of the invention, a plurality of color system zones divided from a coordinate is used, wherein the coordinate includes a first and a second chroma axes and the zones may be distinguished by the signs of the first and the second chroma values and a predetermined factor (e.g., slope) related to the coordinate. Hence, it is possible to determine which one of the color system zones in the coordinate the to-be-adjusted pixel is within according to the first chroma value and the second chroma value.

Therefore, when the to-be-adjusted pixel of the digital color image belonging to the color system zone is found, the first chroma and the second chroma thereof are adjusted according to the required saturation of the pixel. In summary, the invention discloses a saturation adjusting method capable of making the color shown by the overall pixels in digital color image more colorful by adjusting the pixel of the single color system in the digital color image independently.

Other objects, features, and advantages of the invention will become apparent from the following detailed description of the preferred but non-limiting embodiments. The following description is made with reference to the accompanying drawings.

DETAILED DESCRIPTION OF THE INVENTION

The embodiments of the invention comprise the steps of finding out the $C_b$, $C_r$ chroma values of pixels corresponding to the to-be-adjusted color system of a digital color image, and adjusting the $C_b$, $C_r$ values of the pixels, so as to modify the saturation. Since the saturation of the pixel in the digital color image relates to the chromas (two variables) $C_b$, $C_r$, the following embodiments of the invention will be described by taking the $C_b$, $C_r$ coordinate as an example.

Figure 1:
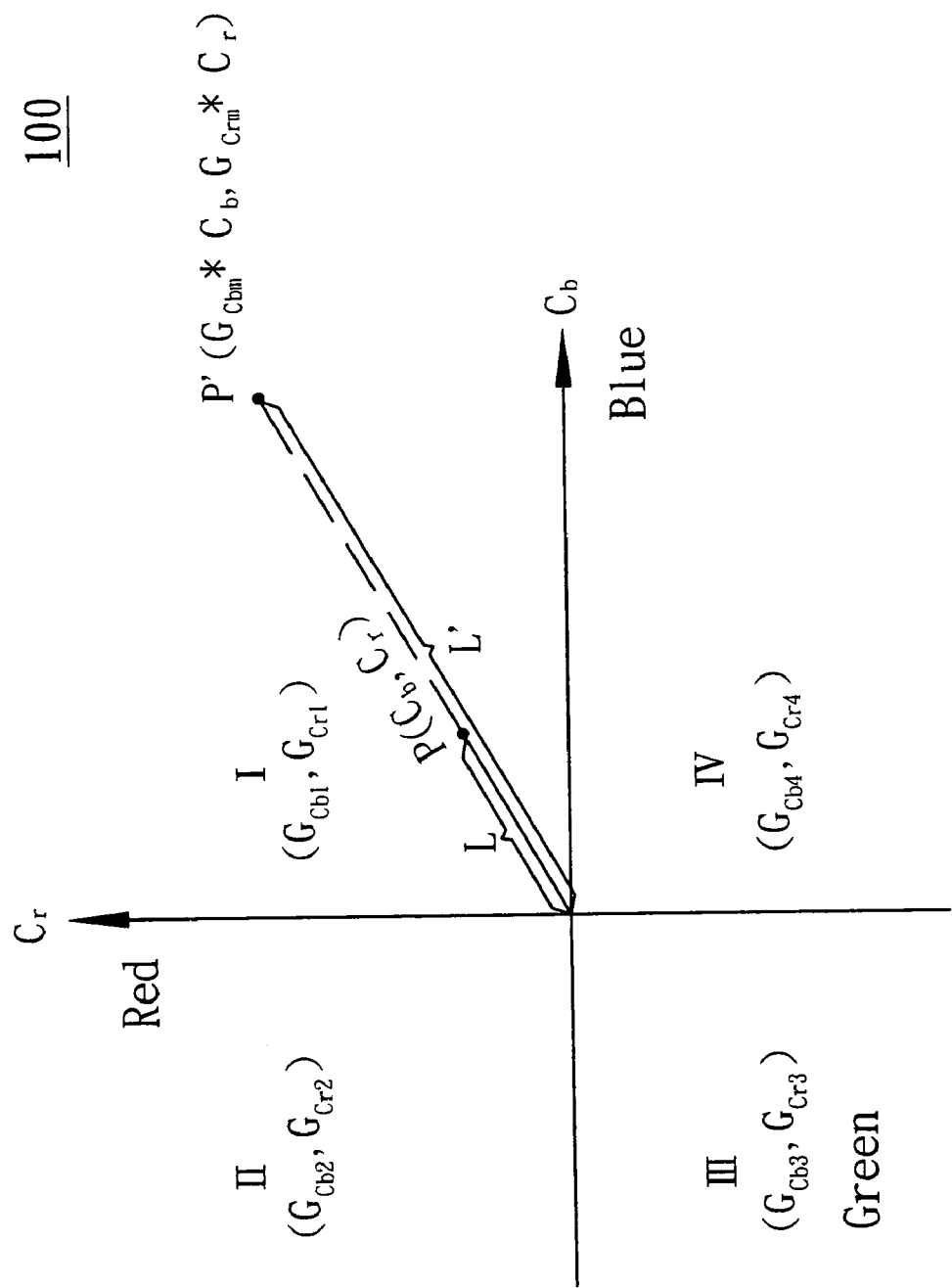
FIG. 1 is a coordinate graph showing the relationship between L, $C_b$, $C_r$ and each color system.

Please refer to FIG. 1. FIG. 1 is a coordinate graph showing the relationship between L, $C_b$, $C_r$ and each color system in accordance with an embodiment of the invention, wherein L denotes the length from the origin to a position P with the $C_b$, $C_r$ values and represents the corresponding saturation. As shown in FIG. 1, four quadrants including a first quadrant I, a second quadrant II, a third quadrant III and a fourth quadrant IV are defined according to the signs of the two variables $C_b$, $C_r$, and the position of the $C_b$, $C_r$ values corresponding to a pixel of a digital color image may be represented as P=($C_b$, $C_r$) on the coordinate 100. Consequently, the color corresponding to the $C_b$, $C_r$ pair will be realized according to the quadrant that the position P locates at.

That is, if the signs of the $C_b$, $C_r$ values of the pixel in the digital color image are both positive, the position P will be within the first quadrant I of the coordinate 100, and the color corresponding to the $C_b$, $C_r$ pair is substantial magenta. If the signs of the $C_b$, $C_r$ values of the pixel in the digital color image are respectively negative and positive, the position P will be within the second quadrant II of the coordinate 100, and the color corresponding to the $C_b$, $C_r$ pair of the pixel in the digital color image is substantial orange.

Similarly, if the signs of the $C_b$, $C_r$ values of the pixel in the digital color image are both negative, the position P will be within the third quadrant III of the coordinate 100, and the color corresponding to the $C_b$, $C_r$ pair of the pixel in the digital color image is substantial green. If the signs of the $C_b$, $C_r$ values of the pixel in the digital color image are respectively positive and negative, the position P will be within the fourth quadrant IV of the coordinate 100, and the color corresponding to the $C_b$, $C_r$ pair of the pixel in the digital color image is substantial blue.

When the coordinate 100 is defined to represent the corresponding color of $C_b$, $C_r$ pairs of the pixels in the digital color image, it is possible to find the $C_b$, $C_r$ pairs of the to-be-adjusted pixels corresponding to some color systems or a single color system on the coordinate and adjust the $C_b$, $C_r$ values (i.e. L value) of each pair, so that the saturation of the pixels corresponding to the color systems or a single color system of the digital color image will be adjusted consequently.

In the preferred embodiment of the invention, in order to adjust the $C_b$, $C_r$ values of the to-be-adjusted pixels after they have been found, it is possible to adjust these $C_b$, $C_r$ values with length L according to the chroma gains $(G_{cb1}, G_{cr1})$ $(G_{cb2}, G_{cr2})$, $(G_{cb3}, G_{cr3})$ and $(G_{cb4}, G_{cr4})$ of the quadrants on the coordinate 100. That is to say, when the length L' of the adjusted $C_b$, $C_r$ pair is greater than the length L of the original $C_b$, $C_r$ pair, the saturation of the adjusted pixel is increased. When the length L' of the adjusted $C_b$, $C_r$ pair is smaller than the length L of the original $C_b$, $C_r$ pair, the saturation of the adjusted pixel is decreased. When the length L' of the adjusted $C_b$, $C_r$ pair is equal to the length L of the original $C_b$, $C_r$ pair, both $G_{cb}$ and $G_{cr}$ equal to 1 for example, the saturation of the pixel is kept unchanged.

In the first embodiment, when the pixels of the blue color system are to be adjusted, the $C_b$, $C_r$ pairs of the pixels consisting with the blue color system may be firstly found on the coordinate 100, that is, the $C_b$, $C_r$ pairs located within the fourth quadrant IV may be found firstly. Then, the $C_b$, $C_r$ values of the pixels in the fourth quadrant IV are adjusted by changing $C_b$, $C_r$ to $G_{cb4}*C_b$, $G_{cr4}*C_r$. If the pixels of the red color system, i.e. the magenta and orange color systems, are to be adjusted, the adjustment is performed in the first quadrant I and the second quadrant II. Of course, the gain value in each quadrant is programmable and may be set.

Figure 2:
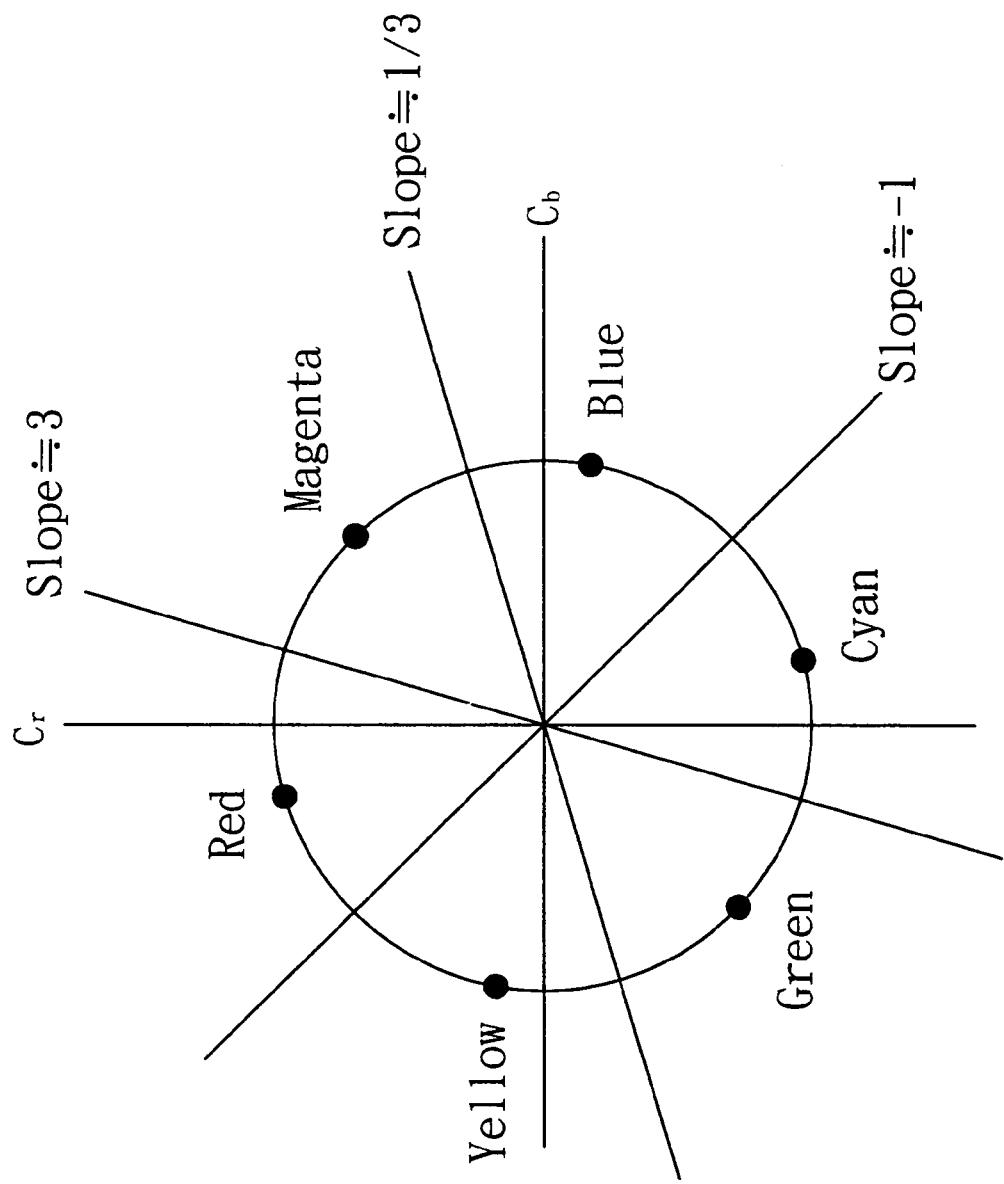
FIG. 2 is a coordinate graph showing the relationship between the $C_b$, $C_r$ coordinate and a plurality of color systems.

The second embodiment of the invention will be described with reference to FIG. 2. FIG. 2 is a coordinate graph showing the relationship between the $C_b$, $C_r$ coordinate and a plurality of color system zones. The plurality of color system zones is defined according to the values of the two variables $C_b$, $C_r$. For example, the red color system zone is defined by the conditions, in which the $C_r$ value is positive and the slope is greater than 3 or smaller than −1; if the $C_r$ value is negative and the slope is greater than 3 or smaller than −1, the zone is defined as the cyan color system zone. The blue color system zone is defined by the following conditions, in which the $C_b$ value is positive and the slope is between −1 and ⅓; if the $C_b$ value is negative and the slope is between −1 and ⅓, the zone is defined as the yellow color system zone. The magenta color system zone is defined by the following conditions, in which the $C_b$ value (or $C_r$ value) is positive and the slope is between ⅓ and 3; if the $C_b$ value (or $C_r$ value) is negative and the slope is between ⅓ and 3, the zone is defined as the green color system zone.

Accordingly, the pixels of the to-be-adjusted color system zone can be found within the to-be-adjusted color system zone and adjusted according to the zone gain of the coordinate 100.

So, the method of the invention for adjusting the saturation of one or more pixels of a digital color image does not directly adjust the saturation of all color systems in the digital color image. Instead, four quadrants or a plurality of color system zones may be defined by the $C_b$, $C_r$ values, which are corresponding to the pixel in the digital color image and are associated with the saturation. Then, the $C_b$, $C_r$ pair of the pixel within the quadrant (or color system zone) consisting with the to-be-adjusted color system may be adjusted, and thus the saturation thereof may be adjusted.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for adjusting saturation of a color system of a digital color image, the digital color image having a plurality of pixels, each of which has coordinate values on a color coordinate, which includes a plurality of color system zones, the method comprising the steps of:
   determining a corresponding color system zone from the color system zones according to the color system, wherein the color coordinate comprises a $C_b$ coordinate axis representing a coordinate value $C_b$ and a $C_r$ coordinate axis representing a coordinate value $C_r$; and
   adjusting the saturation of the pixel with the coordinate values located within the corresponding color system zone through at least a step of determining chroma gains $G_{cbm}$ and $G_{crm}$ and changing the coordinate values $(Cb_b, C_r)$ of the pixel into $(G_{cbm}*G_b, G_{crm}*C_r)$.

2. The method according to claim 1, wherein the step of adjusting the saturation of the pixel is to adjust the coordinate values $(C_b, C_r)$ of the pixel.

3. The method according to claim 1, wherein $G_{cbm}$ is equal to $G_{crm}$.

4. The method according to claim 1, wherein the chroma gains are programmable.

5. The method according to claim 1, wherein the color coordinate is divided into four quadrants and each quadrant represents one of the color system zones.

6. A method for adjusting saturation of a color system of a digital color image, the digital color image having a plurality of pixels, each of which has coordinate values on a color coordinate, which includes a plurality of color system zones, the method comiprising the steps of:
   determining a corresponding color system zone from the color system zones according to the color system;
   adjusting the saturation of the pixel with the coordinate values located within the corresponding color system zone; and
   judging whether or not the coordinate values of the pixel are within the corresponding color system zone according to signs of the coordinate values of the pixel.

7. A method for adiusting saturation of a color system of a digital color image, the digital color image having a plurality of pixels, each of which has coordinate values on a color coordinate, which includes a plurality of color system zones, the method comiprising the steps of:
   determining a corresponding color system zone from the color system zones according to the color system;
   adjusting the saturation of the pixel with the coordinate values located within the corresponding color system zone; and
   judging whether or not the coordinate values of the pixel are within the corresponding color system zone according to the slope determined by the position of the coordinate values of the pixel and the origin of the color coordinate.

8. A method for adjusting the saturation of a digital color image, comprising the steps of:
   finding a corresponding pixel in the digital color image according to a color of a color system on a color coordinate wherein the corresponding pixel has coordinate values ($C_b$, $C_r$) on the color coordinate;

adjusting the saturation of the corresponding pixel through at least a step of adjusting the coordinate values ($C_b$, $C_r$); and determining chroma gains $G_{cbm}$ and $G_{crm}$ and changing the coordinate values ($C_b$, $C_r$) of the corresponding pixel into ($G_{cbm}*C_b$, $G_{crm}*C_r$).

9. The method according to claim 8, wherein the color of the color system on the color coordinate has a plurality of color system zones, and the color of the color system and the corresponding pixel belong to the same color system zone.

10. The method according to claim 8, wherein $G_{cbm}$ is equal to $G_{crm}$.

11. The method according to claim 8, wherein the chroma gains are programmable.

12. The method according to claim 8, further comprising the step of:

judging whether or not the coordinate values ($C_b$, $C_r$) the corresponding pixel are within a corresponding color system zone according to signs of the coordinate values ($C_b$, $C_r$) the corresponding pixel.

13. The method according to claim 8, further comprising the step of:

judging whether or not the coordinate values ($C_b$, $C_r$) the corresponding pixel are within a corresponding color system zone according the slope determined by the position of the coordinate values ($C_b$, $C_r$) of the corresponding pixel and the origin of the color coordinate.

14. The method according to claim 13, wherein the color coordinate is divided into color system zones according to the slopes with substantial values of 3, ⅓ and −1.

15. The method according to claim 8, wherein the color of the color system on the color coordinate has four quadrants, and the color of the color system and the corresponding pixel belong to the same quadrant.

* * * * *